(12) United States Patent
Liu et al.

(10) Patent No.: US 11,237,320 B2
(45) Date of Patent: Feb. 1, 2022

(54) BACKLIGHT SOURCE, LIQUID CRYSTAL MODULE AND DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Xiaolong Liu, Beijing (CN); Zhihui Wang, Beijing (CN); Gang Chen, Beijing (CN); Changgong Zhu, Beijing (CN); Jianghong Wen, Beijing (CN); Keguo Liu, Beijing (CN); Xuefeng Wang, Beijing (CN); Yanli Zhao, Beijing (CN); Guang Wang, Beijing (CN); Yu Wang, Beijing (CN); Di Wang, Beijing (CN); He Sun, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 30 days.

(21) Appl. No.: 16/831,253

(22) Filed: Mar. 26, 2020

(65) Prior Publication Data
US 2021/0149106 A1  May 20, 2021

(30) Foreign Application Priority Data

Nov. 18, 2019 (CN) .......................... 201921997724.2

(51) Int. Cl.
*F21V 8/00* (2006.01)

(52) U.S. Cl.
CPC ......... *G02B 6/0088* (2013.01); *G02B 6/0055* (2013.01)

(58) Field of Classification Search
None
See application file for complete search history.

(56) References Cited

U.S. PATENT DOCUMENTS

| 2013/0286319 | A1* | 10/2013 | Kuo | G02F 1/133608 349/58 |
| 2013/0286321 | A1* | 10/2013 | Kuo | G02F 1/133608 349/58 |
| 2014/0063403 | A1* | 3/2014 | Chen | G02F 1/133308 349/58 |

FOREIGN PATENT DOCUMENTS

WO  WO-2013159395 A1 * 10/2013  ....... G02F 1/133308

* cited by examiner

*Primary Examiner* — Edward J Glick
*Assistant Examiner* — David Y Chung
(74) *Attorney, Agent, or Firm* — Kinney & Lange, P.A.

(57) ABSTRACT

A backlight source, a liquid crystal module, and a display device are provided. The backlight source includes a back plate and a plurality of support structures. The back plate includes a side wall and a bottom plate, and the side wall and the bottom plate define a first groove. A plurality of the support structures are arranged along a circumferential direction of the side wall and spaced apart from each other. The support structure is detachably connected to the side wall, and extends toward a center of the accommodation groove to form a support plane.

16 Claims, 6 Drawing Sheets

BACKLIGHT SOURCE, LIQUID CRYSTAL MODULE AND DISPLAY DEVICE

CROSS-REFERENCE TO RELATED APPLICATION

The present application claims a priority to Chinese Patent Application No. 201921997724.2 filed in China on Nov. 18, 2019, the disclosure of which is incorporated herein by reference in its entirety.

BACKGROUND

The present disclosure relates generally to display technology, and more particularly to a backlight source, a liquid crystal module, and a display device.

A liquid crystal module in the related art typically includes a backlight source and a display panel. Some conventional modules support the display panel with a plastic frame, combining the display panel and the backlight source with adhesive. Design processes for such plastic frames can be difficult and expensive. Additionally, plastic frame can be among the most vulnerable parts of the backlight source, with poor reworkability and a high rate of defects. For these reasons, the yield of such liquid crystal module is not ideal, resulting in high production costs.

SUMMARY

In view of the above, the embodiments of the present disclosure provide a backlight source, a liquid crystal module and a display device.

In one aspect, an embodiment of the present disclosure provides a backlight source, which includes: a back plate and a plurality of support structures; the back plate includes a side wall and a bottom plate, and the side wall and the bottom plate define a first groove; a plurality of the support structures are arranged along a circumferential direction of the side wall and spaced apart from each other; and the support structure is detachably connected to the side wall, and extends toward a center of the first groove to form a support plane.

Optionally, the support structure includes a fixing part and a support part, the fixing part includes a first fixing plate, a second fixing plate, and a third fixing plate that are connected sequentially in that order, the first fixing plate, the second fixing plate and the third fixing plate define an opening slot, the support part is of a plate shape, the support plane is a surface of the support part distal to the bottom plate, the support part is connected to the third fixing plate, and an end of the side wall distal to the bottom plate is inserted into the opening slot.

Optionally, the first fixing plate is provided with a clamping hole penetrating through the first fixing plate, an outer surface of the side wall is provided with a clamping protrusion, and the clamping protrusion is clamped in the clamping hole.

Optionally, an end of the first fixing plate distal to the second fixing plate is tilted in a direction away from the side wall.

Optionally, a surface of the clamping protrusion distal to the bottom plate is an inclined surface, and an acute angle is formed between the inclined surface and the first direction, wherein the first direction is perpendicular to the bottom plate.

Optionally, a second groove is formed on the outer surface of the side wall, the second groove extends in a second direction and protrudes from an inner surface of the side wall, and the second groove is in communication with a bearing surface of the side wall, wherein the bearing surface is a side surface of the side wall distal to the bottom plate, and the second direction directs from the outer surface of the side wall to the inner surface of the side wall; the second groove includes a groove wall, a groove bottom, and a first opening, the groove wall is connected to the outer surface of the side wall, the groove bottom is recessed relative to the outer surface of the side wall, the first opening is located on the bearing surface, the clamping protrusion is formed on the groove bottom, and the first fixing plate is accommodated in the second groove, wherein the second groove is formed in a middle region of the side wall; and the bearing surface has an opening region corresponding to the first opening, and the opening region extends to the bearing surface.

Optionally, the side wall includes extended side walls and the second grooves, the extended side walls and the second grooves are arranged alternately along a length direction of the side wall, the extended side wall is formed at an end of the side wall distal to the bottom plate and extends in a direction toward the bottom plate, and the extended side wall is stacked on the outer surface of the side wall.

Optionally, the backlight source further includes a reflector, a light guide plate, and an optical film sequentially stacked on the bottom plate in that order; wherein the support part is located on a side of the optical film distal to the bottom plate; or the optical film is arranged in a same layer as the support part, and an edge of the optical film is provided with a gap, and the support part is clamped in the gap.

Optionally, the backlight source further includes: a bar-shaped light source arranged between the light guide plate and the side wall, wherein the side wall includes a plurality of sub-side walls, at least one of the sub-side walls is a light-shielding side wall, the light-shielding side wall is adjacent to the bar-shaped light source and in a same length direction as the bar-shaped light source, a side of the light-shielding side wall distal to the bottom plate is provided with a bent edge portion that is bent toward the first groove, and the support structures are arranged in a region of the side wall where no bent edge portion is provided.

Optionally, the support plane is parallel to the bottom plate, and the first groove is configured to accommodate a part of a display panel.

Optionally, the support plane is configured to support the display panel at a preset level.

In a second aspect, an embodiment of the present disclosure further provides a liquid crystal module, which includes: a display panel and any one of the above backlight sources, wherein the display panel is arranged on the support plane of the support structure of the backlight source, and the support plane is configured to support the display panel at a preset level.

In a third aspect, an embodiment of the present disclosure further provides a display device, which includes the liquid crystal module described above.

The above description is only an overview of the technical solutions of the present disclosure. The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

In order to further explain the technical solutions and effects covered by the present disclosure, a backlight source, a liquid crystal module, and a display device are presented. Specific implementations, structures, characteristics, and effects thereof are described in the following disclosure in combination with the accompanying drawings and preferred embodiments.

In an aspect, as shown in FIG. 1 to FIG. 12, an embodiment of the present disclosure provides a backlight source, which includes: a back plate 1 and a plurality of support structures 2; the back plate 1 includes a side wall 12 and a bottom plate 11, and the side wall 12 and the bottom plate 11 define a accommodation groove 13; a plurality of the support structures 2 are arranged along a circumferential direction of the side wall 12; the support structure 2 is detachably connected to the side wall 12, and extends toward a center of the accommodation groove 13 to form a support plane 23, and the support plane 23 is an upper surface of a support part 22 distal to the bottom plate 11 and is configured to support the display panel 7 at a preset level.

The back plate 1 is of groove structure, specifically, the back plate 1 includes the bottom plate 11 and the side wall 12 which are connected to each other, the side wall 12 is formed around the bottom plate 11 and defines the accommodation groove 13 together with the bottom plate 11. The plurality of the support structures 2 are arranged along the circumferential direction of the side wall 12, the support plane 23 on the support structure 2 may support the display panel 7, and the support structure 2 is detachably connected to the side wall 12, so that the support structure 2 may be recycled.

In the related art, a plastic frame is configured to support the display panel 7 and bond the display panel 7 and the backlight source, the plastic frame supports the display panel 7 at a preset level, so that there is a gap between the display panel 7 and an optical film 5, which avoids interference between the display panel 7 and an optical film 5 when the optical film 5 expands, so as to prevent the display panel 7 and the optical film 5 from being damaged. However, use of the plastic frame has the following disadvantages. In particular, the plastic frame is made of a combination of polycarbonate material and glass fiber, and formed by injection molding. In the backlight source, the plastic frame is a part with complex design and fine structure, which is difficult to be manufactured and its production cost is high. The thinnest thickness of the plastic frame is less than 0.4 mm, it is prone to deformation and fracture, and it is difficult to fix the plastic frame with the back plate, and it is prone to defects. In addition, the plastic frame is also a vulnerable part of the backlight source, its defective fraction is also high, that is, the plastic frame itself is also easy to be damaged, resulting in an increase in defects of the backlight source. In addition, in order to fit the plastic frame, it is typically necessary to form a hole in a lateral side surface of the back plate 1 and form grooves at four corners of the back plate 1 in the backlight source, thereby reducing intensity of the backlight source.

In the embodiments of the present disclosure, the support structure 2 may support the display panel 7, it may replace the plastic frame in the related art. The support structure 2 is clamped with the back plate 1 and is detachably connected to the back plate 1. If the support structure 2 is found to be damaged during a process of installing the support structure 2, the support structure 2 may be disassembled and replaced with another support structure 2 of high quality. Therefore, yield of the backlight source may be increased. At the same time, since the support structure 2 of high quality may be guaranteed to be used in the backlight source, service life of the backlight source may be increased, and the support structure 2 may be recycled. In the related art, production cost of the plastic frame is high, and cost of its mold is high. Since the plastic frame is replaced by the support structure 2, production cost of the backlight source may be reduced. In addition, it is unnecessary to form a hole in a lateral side surface of the back plate 1 and form grooves at four corners of the back plate 1 in the backlight source, which increases the intensity of the backlight source. In addition, the support structure 2 may be made of a metal material (e.g., aluminum), such that the strength of the support structure 2 is greater than strength of the plastic frame, it is not easy to be damaged, and defective rate of the backlight source is reduced. At the same time, the support structure 2 is used for supporting the display panel 7, such that both strength of the backlight source and strength of the liquid crystal module are increased, thereby increasing service life of the backlight source and service life of the liquid crystal module.

The purpose of the present disclosure may be further achieved and the technical problem may be further solved by adopting the following technical solution.

Specifically, as shown in FIG. 2, FIG. 4 to FIG. 6, the support structure 2 includes a fixing part 21 and a support part 22, the fixing part 21 includes a first fixing plate 211, a second fixing plate 212, and a third fixing plate 213 that are connected sequentially in that order, the first fixing plate 211, the second fixing plate 212, and the third fixing plate 213 define an opening slot 214. The support part 22 is connected to the third fixing plate 213, and an end of the side wall 12 distal to the bottom plate 11 is inserted into the opening slot 214. Thus, a part of the side wall 12 of the back plate 1 is located within the opening slot 214, so that the support structure 2 "rides" on the side wall, the first fixing plate 211 is located outside the accommodation groove 13, and the third fixing plate 213 is located inside the accommodation groove 13. When the fixing part 21 is fixed on the side wall 12, the first fixing plate 211 is attached to an outer surface of the side wall 12, and the third fixing plate 213 is attached to an inner surface of the size 12. The support structure 2 may be hung on the side wall 12 through a shape of the opening slot 214 defined by three fixing plates 211-213. In order to ensure reliability of a connection between the fixing part 21 and the side wall 12, the opening slot 214 may be tightened gradually along a direction from the second fixing plate 212 toward the back plate 1, so that the first fixing plate 211 and the third fixing plates 213 exert a pressure to the side wall 12 at respective ends proximate to the back plate 1, that is, a clamping force may be applied, so that the fixing part 21 is fixed on the side wall 12.

Figure 3:
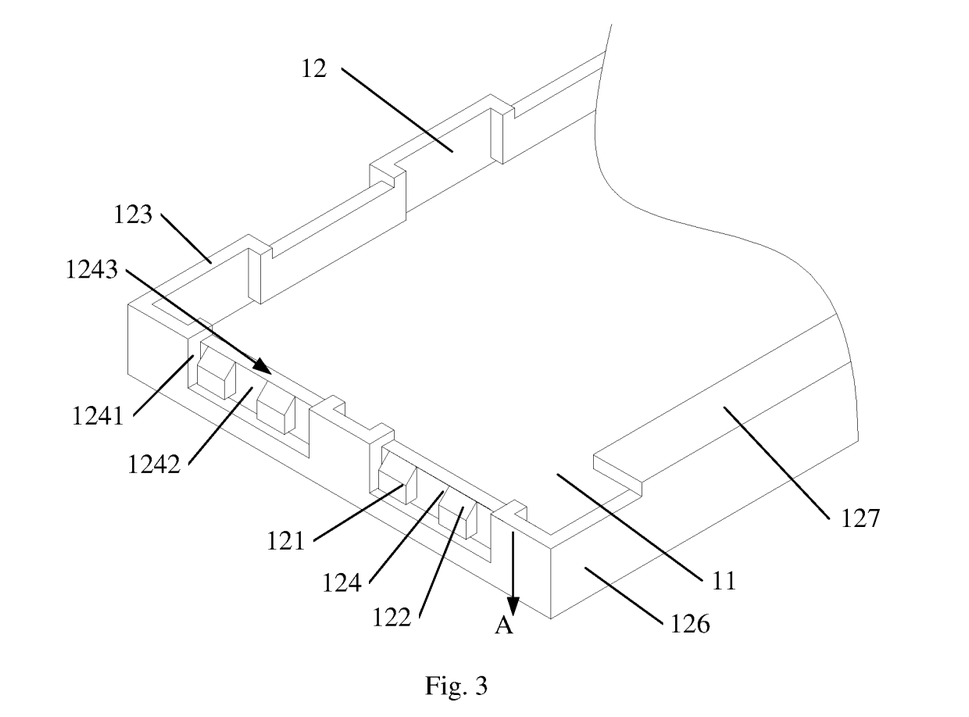
FIG. 3 is a schematic structural diagram of a back plate of a backlight source according to an embodiment of the disclosure.
Figure 5:
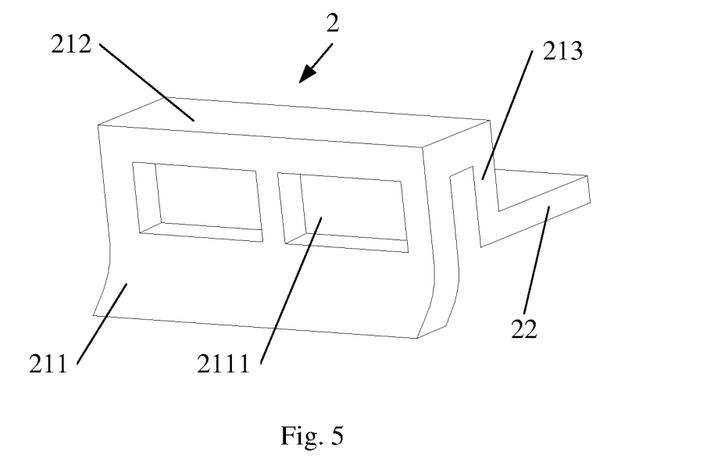
FIG. 5 is another schematic structural diagram of a support structure of a backlight source according to an embodiment of the present disclosure.
Figure 6:
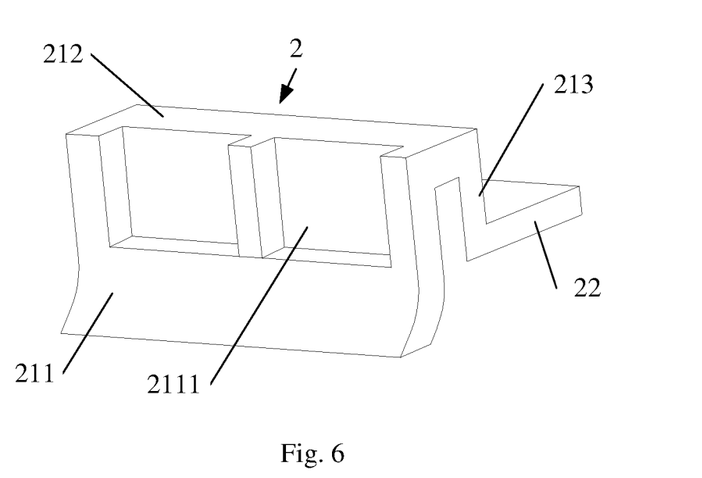
FIG. 6 is yet another schematic structural diagram of a support structure of a backlight source according to an embodiment of the present disclosure.

Specifically, as shown in FIG. 3, FIG. 5 and FIG. 6, the first fixing plate 211 is provided with a clamping holes 2111 penetrating through the first fixing plate 211, the outer surface of the side wall 12 is provided with a clamping protrusion 121, and the clamping protrusion 121 is clamped in the clamping hole 2111. The first fixing plate 211 is provided with the clamping hole 2111, which is configured to be clamped with the clamping protrusion 121 on the outer surface of the side wall 12. A number of the clamping holes 2111 is at least one, and the number of the clamping holes 2111 may be determined according to a size of the first fixing plate 211. As shown in FIG. 5 and FIG. 6, two clamping holes 2111 may be arranged on the first fixing plate 211, the clamping hole 2111 may be of a rectangular shape, two clamping protrusions 121 are arranged on the side wall 12 corresponding to the first fixing plate 211, and the number of clamping protrusions 121 is same as the number of clamping holes 2111. Optionally, the support part 22 may be connected to an end of the third fixing plate 213 distal to the second fixing plate 212, or may be connected to any other part of the third fixing plate 213. The plurality of support structures 2 may be evenly distributed on the side wall 12. Generally, the display device is a cuboid structure, and the backlight source is also a cuboid structure. Correspondingly, the bottom plate 11 of the back plate 1 is of a rectangular shape, and the bottom surface of the accommodation groove 13 is rectangular. Accordingly, the side wall 12 includes four sub-side walls surrounding the rectangular shape, a length of each of two opposite sub-side walls is a, a length of the support structure 2 along the length direction of the side wall 12 is b, and the plurality of support structures 2 are arranged on the side wall 12 of the back plate 1.

Figure 1:
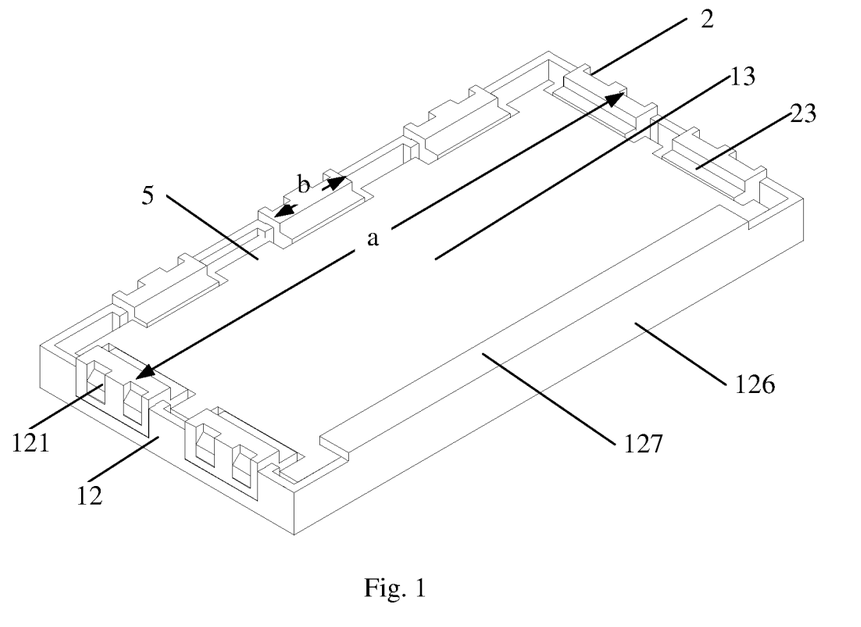
FIG. 1 is a schematic structural diagram of a backlight source according to an embodiment of the present disclosure.

Specifically, there may be two scenarios. In a first scenario, as shown in FIG. 1, the plurality of support structures 2 are arranged on one sub-side wall, and the plurality of support structures 2 are evenly arranged on the sub-side wall; and in a second scenario, b is slightly smaller than a, and the support structure 2 is arranged in a middle region of the sub-side wall, two ends of the sub-side wall are separated from respective two ends of the support structure 2 by preset distances, that is, two ends of the sub-side wall do not coincide with respective two ends of the support structure 2, so as to avoid interference of the support structures 2 on adjacent sub-side walls. At the same time, when the plurality of support structures 2 are arranged on a sub-side wall, there is a gap between the support structures 2, and a bearing force is generated only at a position where the support structure 2 is in contact with the display panel 7, which may cause uneven force on the display panel 7. In the embodiments of the present disclosure, this situation may be avoided, and a size of the support structure 2 may be determined through experiments. Here, the size of each component in an embodiment is specifically described. A size of the first fixing plate 211 along a length direction of the sub-side wall is 20 mm, and a length of the support structure 2 along a direction from the first fixing plate 211 toward the third fixing plate 213 is 2.2 mm, a length of the support structure 2 along a direction from the second fixing plate 212 toward the opening slot 214 is 1.8 mm, and a thickness of each of the first fixing plate 211, the second fixing plate 212, and the third fixing plate 213 is 0.2 mm. Bearing capacity of the support structure 2 is determined through experiments. Generally, a weight of the display panel is less than 200 g, and its gravity is about 2N. A single support structure 2 made of stainless steel exerts force of 10N and 100N, respectively, and maximum displacements thereof are 1.43 μm and 0.014 mm, respectively, and a weight of the display panel is far less than 10N. Therefore, the bearing capacity of the support structure 2 meets requirements.

The first fixing plate 211, the second fixing plate 212, and the third fixing plate 213 have same length along the length direction of the sub-side wall. Since the support structure is made of metal material, each fixing plate may be made into a thin plate shape. A thickness of each of the first fixing plate 211 and the third fixing plate 213 may be 0.1 mm, and a thickness of the side wall 12 may be 0.3 mm, so a width of a frame of the improved backlight source may be reduced to be 0.5 mm. In the related art, because the thickness of the plastic frame is 0.8 mm, a thickness of the backlight source in the related art is 1.4 mm. Therefore, as compared with the related art, the embodiments of the present disclosure effectively reduces a thickness of the frame. At the same time, due to reduction of a thickness of the frame, it effectively reduce defects such as leakage of light and loss of light.

Figure 4:
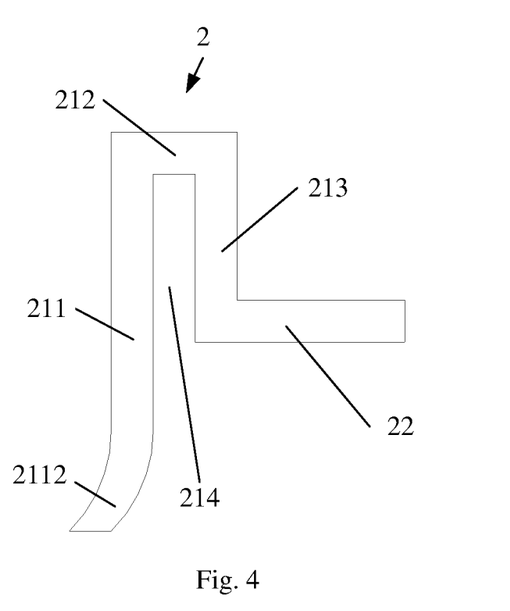
FIG. 4 is a schematic structural diagram of a support structure of a backlight source according to an embodiment of the present disclosure.

Specifically, as shown in FIGS. 4 to 6, an end of the first fixing plate 211 distal to the second fixing plate 212 is tilted in a direction away from the side wall 12. The first fixing plate 211 includes a tilted part 2112, which may facilitate installation of the support structure 2 and facilitate to clamp. When the support structure 2 is disassembled, the first fixing plate 211 may be separated from the outer surface of the side wall 12 from the tilted portion 2112, thereby facilitating disassembly of the support structure 2.

Figure 7:
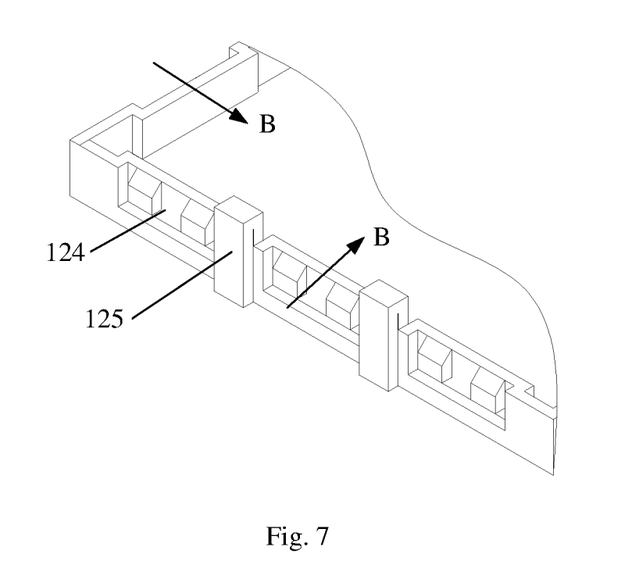
FIG. 7 is another schematic structural diagram of a back plate of a backlight source according to an embodiment of the present disclosure.
Figure 9:
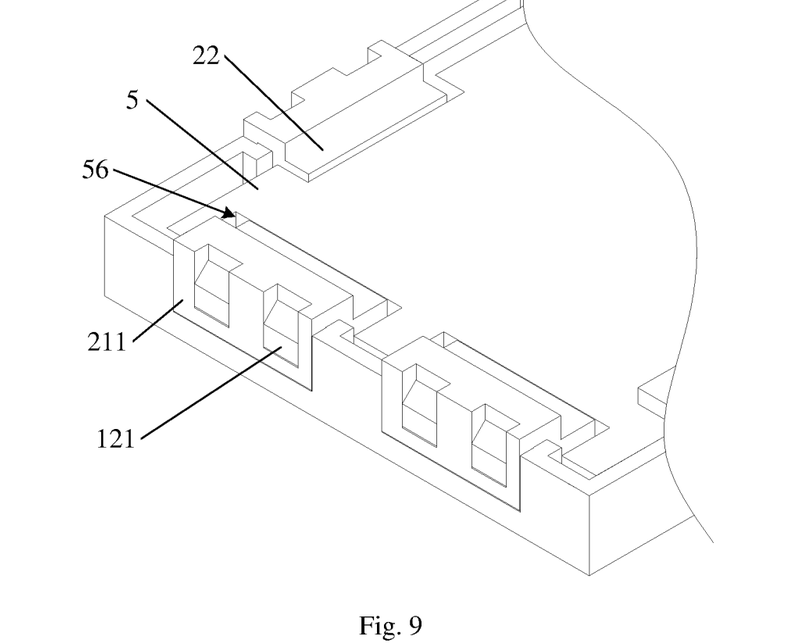
FIG. 9 is a further schematic structural diagram of a backlight source according to an embodiment of the present disclosure.

Specifically, as shown in FIG. 1, FIG. 7, and FIG. 9, a surface of the clamping protrusion 121 distal to the bottom plate 11 is an inclined surface, and an acute angle is formed between the inclined surface 122 and the first direction, wherein the first direction A directs from a side of the side wall 12 distal to the bottom plate 11 toward the bottom plate 11, and is optionally parallel to an extending direction of the side wall 12 toward the bottom plate 11 or perpendicular to the bottom plate 11. As shown in FIG. 3, when the support structure 2 is to be installed, the first fixing plate 211 is enabled to slide from top to bottom, that is, slide along a direction toward the bottom plate 11, and an end of the clamping protrusion 121 distal to the bottom plate 11 is provided with an inclined surface 122, which facilitates the first fixing plate 211 to slide toward the bottom plate 11 and facilitates the installation of the support structure 2. The clamping protrusion 121 may extend to the bearing surface 123 and be flush with the bearing surface 123. When the inclined surface 122 is arranged on the clamping protrusion 121, an end of the slope 122 distal to the bottom plate 11 may extend to the bearing surface 123. At this time, the corresponding clamping hole 2111 needs to extend to the second fixing plate 212 and communicate with the second fixing plate 212, so as to fit the clamping protrusion 121.

Specifically, as shown in FIGS. 3 and 7, an avoidance groove 124 is formed on the outer surface of the side wall 12, the avoidance groove 124 extends along the second direction B and protrudes from the inner surface of the side wall 12, and the avoidance groove 124 is in communication with the bearing surface 123 of the side wall 12, wherein the bearing surface 123 is a side surface of the side wall 12 distal to the back plate 1, and the second direction B directs from the outer surface of the side wall 12 to the inner surface of the side wall 12 and is optionally parallel to the bottom plate 11; the avoidance groove 124 includes a groove wall 1241, a groove bottom 1242, and a mounting opening 1243, the groove wall 1241 is connected to the outer surface of the side wall 12, the groove bottom 1242 is recessed relative to the outer surface of the side wall 12, the mounting opening 1243 is located on the bearing surface 123, the clamping protrusion 121 is formed on the groove bottom 1242, and the first fixing plate 211 is accommodated in the avoidance groove 124, wherein the avoidance groove 124 is formed in a middle region of the side wall 12.

As shown in FIG. 7, the first fixing plate 211 is located in the avoidance groove 124, when the support structure 2 is to be installed, the first fixing plate 211 is enabled to slide into the avoidance groove 124 from the mounting opening 1243. Optionally, the thickness of the first fixing plate 211 is same as depth of the avoidance groove 124, so as to ensure that the first fixing plate 211 does not protrude from the outer surface of the side wall 12. Alternatively, it is also possible not to provide the avoidance groove 124. In this case, the first fixing plate 211 and the clamping protrusion 121 should protrude from the outer surface of the side wall 12, and polyethylene terephthalate may be used to fill a non-protruding part of the outer surface of the side wall 12 to ensure flatness of the backlight source.

In addition, the avoidance groove 124 protrudes from the inner surface of the side wall 12, a part of the inner surface of the side wall 12 corresponding to the avoidance groove 124 is a raised region, and the optical film 5 is arranged in a space defined by a plurality of raised regions, resulting in a side of the optical film 5 cannot be in contact with the recessed region on the inner surface of the side wall 12. At the same time, since four corners of the optical film 5 are easy to break, the avoidance groove 124 is arranged in the middle region of the side wall 12, both ends of the side wall 12 are not provided with the avoidance groove 124, and the raised region is not formed at both ends of the side wall 12, so that a gap is formed between the four corners of the optical film 5 and the inner surface of the side wall 12, the four corners of the optical film 5 do not contact and collide with the side wall 12, thus avoiding damage to the four corners of the optical film 5, and thereby ensuring service life of the optical film 5.

As shown in FIG. 3, the bearing surface 123 has an opening region corresponding to the mounting opening 1243, and the opening region is recessed relative to the bearing surface 123. The opening region corresponding to the mounting opening 1243 is lower than the bearing surface 123, a size of the second fixing plate 212 corresponds to a size of the opening region, and the second fixing plate 212 is located on the bearing surface 123. When the support structure 2 is installed, the second fixing plate 212 does not protrude from the bearing surface 123.

Specifically, as shown in FIG. 7, the side wall 12 includes extended side walls 125 and the avoidance grooves 124, the extended side walls 125 and the avoidance grooves 124 are arranged alternately along a length direction of the side wall, the extended side wall 125 is formed at an end of the side wall 12 distal to the bottom plate 11 and extends in a direction toward the bottom plate 11, and the extended side wall 125 is stacked on the outer surface of the side wall 12. The extended side wall 125 is arranged in a region where the avoidance groove 124 is not provided, so that a part of the region of the side wall 12 is of a double-layer structure, and the side wall 12 is strengthened. The side wall 12 includes a plurality of sub-side walls, and each sub-side wall has a structure in which the avoidance grooves 124 and the extended side walls 125 are arranged alternately.

Figure 2:
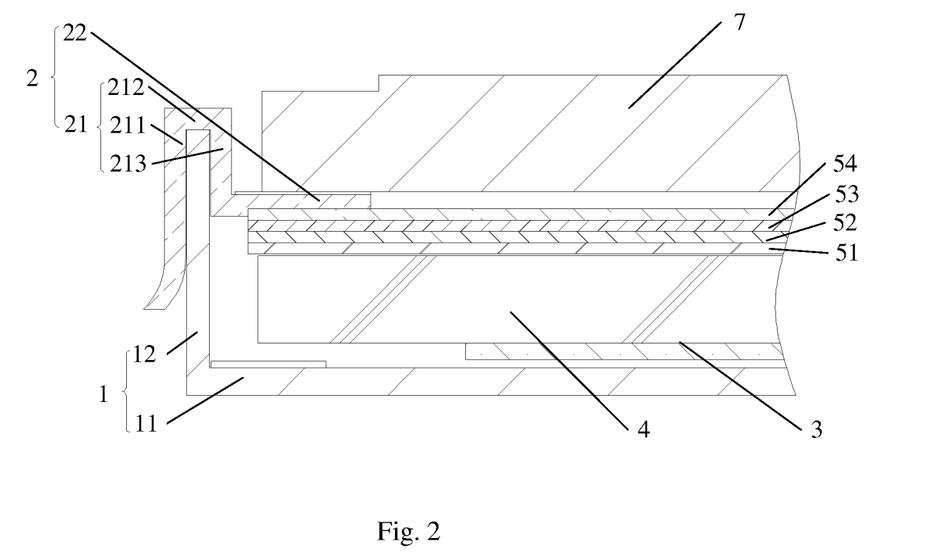
FIG. 2 is another schematic structural diagram of a backlight source according to an embodiment of the present disclosure.
Figure 8:
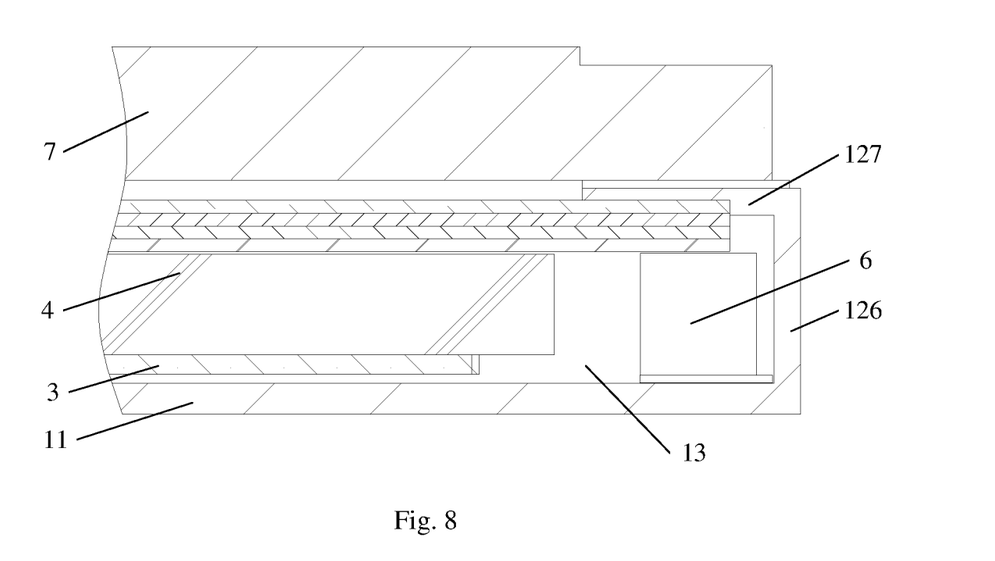
FIG. 8 is yet another schematic structural diagram of a backlight source according to an embodiment of the present disclosure.
Figure 10:
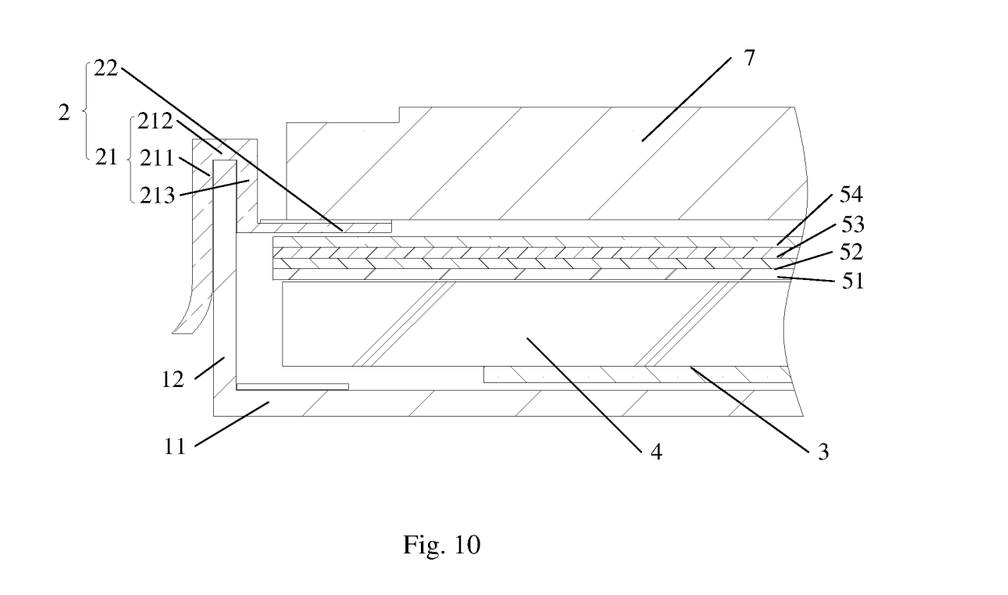
FIG. 10 is another schematic structural diagram of a backlight source according to an embodiment of the present disclosure.

Specifically, as shown in FIG. 2 and FIG. 8, the backlight source further includes a reflector 3, a light guide plate 4, and an optical film 5 sequentially stacked on the bottom plate 11 in that order; the reflector 3 is configured to reflect light emitted from the light guide plate 4 toward the back plate 1 back to the light guide plate 4, wherein a positional relationship between the support part 22 and the optical film 5 is: as shown in FIG. 10, the support part 22 is located on a side of the optical film 5 distal to the bottom plate 11; the plate-shaped support part 22 is fixedly arranged on the fixing part 21, and is clamped on the side wall 12 of the back plate 1 through the fixing part 21. After the display panel 7 is installed on the backlight source, the support part 22 is located between the optical film 5 and the display panel 7, and a support plane for supporting the display panel 7 is formed on a side of the support part 22 proximate to the display panel 7. The optical film specifically includes a lower diffusion sheet 51, a lower prism sheet 52, an upper prism sheet 53, and an upper diffusion sheet 54 which are sequentially stacked on the light guide plate 4 in that order, the lower diffusion sheet 51 is arranged on the light guide plate 4, and the support part 22 is arranged on the upper diffusion sheet 54.

In addition, in another embodiment, as shown in FIG. 2 and FIG. 9, the optical film 5 is arranged in a same layer as the support part 22, and an edge of the optical film 5 is provided with an avoidance gap 56, and the support part 22 is clamped in the avoidance gap 56. The support part 22 may also be clamped with the optical film. Specifically, the optical film is generally of a rectangular shape, and a plurality of avoidance gaps 56 are arranged at the edges of the optical film, and the support part 22 is located at the avoidance gap 56, so that the support part 22 is clamped with the optical film. Therefore, the support part 22 may limit the optical film. Each of the avoidance gap 56 and the support part 22 is optionally of a rectangular shape, and there is an expansion gap between an edge of the avoidance gap 56 and the support part 22, and the avoidance gap 56 and the support part 22 are not completely seamlessly clamped with each other, thereby leaving an expansion space for the optical film. Light-shielding adhesive is arranged on the support plane of the support part 22 (i.e., an upper surface of the support part 22) to avoid light leakage. In order to ensure that there is a gap between the optical film 5 and the display panel 7, it is necessary to ensure that a plane of the support part 22 distal to the bottom plate 11 is higher than a plane of the optical film 5 distal to the bottom plate, or the plane of the support part 22 distal to the bottom plate 11 is higher than the plane of the optical film 5 distal to the bottom plate 11 after the support part 22 fits the light-shielding adhesive.

Figure 11:
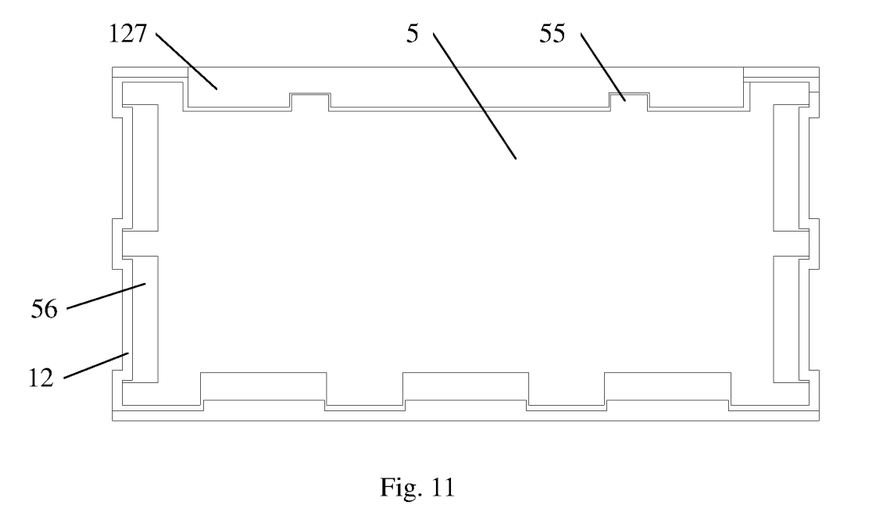
FIG. 11 is yet another schematic structural diagram of a backlight source according to an embodiment of the present disclosure.

Specifically, as shown in FIGS. 1, 8 and 11, the backlight source further includes: a bar-shaped light source 6 arranged between the light guide plate 4 and the side wall 12, the side wall 12 includes a plurality of sub-side walls, at least one of the sub-side walls is a light-shielding side wall 126, the light-shielding side wall 126 is adjacent to the bar-shaped light source 6 and in a same length direction as the bar-shaped light source 6, a side of the light-shielding side wall 126 distal to the bottom plate 11 is provided with a bent edge portion 127 that is bent toward the accommodation groove 13, and the support structures 2 are arranged in a region of the side wall 12 where no bent edge portion 127 is provided. The plurality of sub-side walls form the side wall 12, and the bent edge portion 127 is formed on the light-shielding side wall 126, wherein the bent edge portion 127 is arranged in a middle region of the light-shielding side wall 126, that is, no bent edge portion 127 is formed on two ends of the light-shielding side wall 126. A support structure 2 is arranged on the light-shielding side wall 126 at two ends of the bent edge portion 127 to support the display panel 7. The plurality of support structures 2 are arranged on the sub-side wall where no bent edge portion 127 is provided. In order to facilitate to fix the optical film 5, a fixing ear 55 protruding from the edge of the optical film 5 may be formed at the edge of the optical film 5, and a clamping gap may be formed at an edge of the bent edge portion 127, and the fixing ear 55 is clamped in the clamping gap, thereby limiting the optical film 5. Alternatively, the bent edge portion may not be provided, and each sub-side wall is provided with the support structure 2 to support the display panel 7, so that a structure of the back plate 1 may be simplified by the support structure 2. In the back plate 1, one of the sub-side walls is provided with the bent edge portion 127, and each of the other three sub-side walls is provided with the extended side wall 125. In addition, the back plate may also be provided with the four sub-side walls, each of which is of a structure in which the extended side walls 125 and the avoidance grooves 124 are arranged alternately, wherein the bent edge portion 127 is replaced by the support structure 2.

Figure 12:
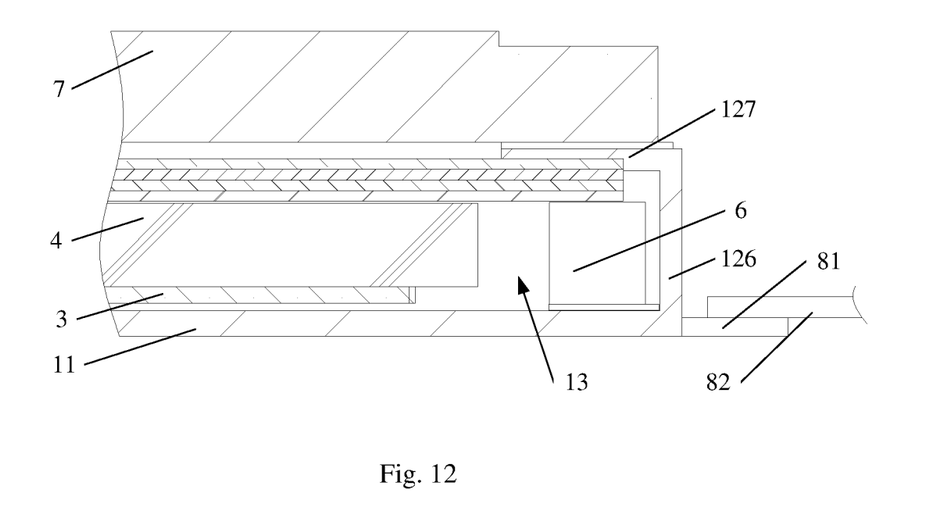
FIG. 12 is still yet another schematic structural diagram of a backlight source according to an embodiment of the disclosure.

In another aspect, an embodiment of the present disclosure also provides a liquid crystal module, which includes a display panel 7 and the backlight source provided in any one of the above embodiments. The display panel 7 is arranged on the support plane 23 of the support structure 2 of the backlight source, and the support plane 23 is configured to support the display panel 7 at a preset level. This embodiment includes the backlight source provided by any one of the above embodiments, and therefore it includes beneficial effects of any one of the above backlight sources, which will not be repeated in detail herein. In addition, the liquid crystal module also includes a prewired circuit board 82. As shown in FIG. 12, a lug 81 is formed on an outer surface of the side wall 12 of the back plate 1 adjacent to the bar-shaped light source 6, a connection through hole is formed in the lug 81, and the prewired circuit board 82 and the lug 81 are connected by bolts. The display panel 7 is connected to the support plane 23 through panel adhesive. When the backlight source is also provided with the bent edge portion 127, the display panel 7 is connected to a side of the bent edge portion 127 distal to the light guide plate 4 through e.g., the panel adhesive.

In yet another aspect, an embodiment of the present disclosure also provides a display device including the above liquid crystal module. This embodiment has all beneficial effects of the liquid crystal module provided by the above embodiments, which are not repeated in detail herein.

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A backlight source comprising:
a back plate comprising a side wall and a bottom plate, wherein the side wall and the bottom plate define a first groove; and
a plurality of support structures arranged along a circumferential direction of the side wall and spaced apart from each other,
wherein the support structure is detachably connected to the side wall, and extends toward a center of the first groove to form a support plane; and
wherein:
the support structure comprises a fixing part and a support part;
the fixing part comprises a first fixing plate, a second fixing plate, and a third fixing plate that are connected sequentially in that order;
the first fixing plate, the second fixing plate and the third fixing plate define an opening slot;
the support part is plate-shaped;
the support plane is a surface of the support part distal to the bottom plate;
the support part is connected to the third fixing plate;
an end of the side wall distal to the bottom plate is inserted into the opening slot; and
an end of the first fixing plate distal to the second fixing plate is tilted in a direction away from the side wall.

2. The backlight source according to claim 1, wherein:
the first fixing plate is provided with a clamping hole penetrating through the first fixing plate;
an outer surface of the side wall is provided with a clamping protrusion; and
the clamping protrusion is clamped in the clamping hole.

3. The backlight source according to claim 2, wherein a surface of the clamping protrusion distal to the bottom plate is an inclined surface, and an acute angle is formed between the inclined surface and the first direction, wherein the first direction is perpendicular to the bottom plate.

4. The backlight source according to claim 2, wherein:
a second groove is formed on the outer surface of the side wall, the second groove extends in a second direction and protrudes from an inner surface of the side wall, and the second groove is in communication with a bearing surface of the side wall, wherein the bearing surface is a side surface of the side wall distal to the bottom plate, and the second direction directs from the outer surface of the side wall to the inner surface of the side wall;
the second groove comprises a groove wall, a groove bottom, and a first opening, the groove wall is connected to the outer surface of the side wall, the groove bottom is recessed relative to the outer surface of the side wall, the first opening is located on the bearing surface, the clamping protrusion is formed on the groove bottom, and the first fixing plate is accommodated in the second groove, wherein the second groove is formed in a middle region of the side wall; and
the bearing surface has an opening region corresponding to the first opening, and the opening region extends to the bearing surface.

5. The backlight source according to claim 4, wherein:
the side wall comprises extended side walls and the second grooves;
the extended side walls and the second grooves are arranged alternately along a length direction of the side wall;
the extended side wall is formed at an end of the side wall distal to the bottom plate and extends in a direction toward the bottom plate; and
the extended side wall is stacked on the outer surface of the side wall.

6. The backlight source according to claim 1, further comprising:
a reflector;
a light guide plate; and
an optical film sequentially stacked on the bottom plate in that order,
wherein:
the support part is located on a side of the optical film distal to the bottom plate; or
the optical film is arranged in a same layer as the support part and an edge of the optical film is provided with a gap, and the support part is clamped in the gap.

7. The backlight source according to claim 6, further comprising:
a bar-shaped light source arranged between the light guide plate and the side wall, wherein the side wall comprises a plurality of sub-side walls, at least one of the sub-side walls is a light-shielding side wall, the light-shielding side wall is adjacent to the bar-shaped light source and in a same length direction as the bar-shaped light source, a side of the light-shielding side wall distal to the bottom plate is provided with a bent edge portion that is bent toward the first groove, and the support structures are arranged in a region of the side wall where no bent edge portion is provided.

8. The backlight source according to claim 1, wherein
the support plane is parallel to the bottom plate, and the first groove is configured to accommodate a part of a display panel.

9. The backlight source according to claim 1, wherein the support plane is configured to support the display panel at a preset level.

10. A liquid crystal module, comprising a display panel and the backlight source according to claim 1, wherein the display panel is arranged on the support plane of the support structure of the backlight source, and the support plane is configured to support the display panel at a preset level.

11. The liquid crystal module according to claim 10, wherein the first fixing plate is provided with a clamping hole penetrating through the first fixing plate, an outer surface of the side wall is provided with a clamping protrusion, and the clamping protrusion is clamped in the clamping hole.

12. The liquid crystal module according to claim 11, wherein a surface of the clamping protrusion distal to the bottom plate is an inclined surface, and an acute angle is formed between the inclined surface and the first direction, wherein the first direction is perpendicular to the bottom plate.

13. The liquid crystal module according to claim 11, wherein:
a second groove is formed on the outer surface of the side wall, the second groove extends in a second direction and protrudes from an inner surface of the side wall, and the second groove is in communication with a bearing surface of the side wall, wherein the bearing surface is a side surface of the side wall distal to the bottom plate, and the second direction directs from the outer surface of the side wall to the inner surface of the side wall;
the second groove comprises a groove wall, a groove bottom, and a first opening, the groove wall is connected to the outer surface of the side wall, the groove bottom is recessed relative to the outer surface of the side wall, the first opening is located on the bearing surface, the clamping protrusion is formed on the groove bottom, and the first fixing plate is accommodated in the second groove, wherein the second groove is formed in a middle region of the side wall; and
the bearing surface has an opening region corresponding to the first opening, and the opening region extends to the bearing surface.

14. The liquid crystal module according to claim 13, wherein
the side wall comprises extended side walls and the second grooves, the extended side walls and the second grooves are arranged alternately along a length direction of the side wall, the extended side wall is formed at an end of the side wall distal to the bottom plate and extends in a direction toward the bottom plate, and the extended side wall is stacked on the outer surface of the side wall.

15. The liquid crystal module according to claim 10, wherein the backlight source further comprises a reflector, a light guide plate, and an optical film sequentially stacked on the bottom plate in that order; and wherein:
the support part is located on a side of the optical film distal to the bottom plate; or
the optical film is arranged in a same layer as the support part, and an edge of the optical film is provided with a gap, and the support part is clamped in the gap.

16. A display device comprising the liquid crystal module according to claim 10.

* * * * *